US011957108B1

(12) United States Patent
Pope

(10) Patent No.: US 11,957,108 B1
(45) Date of Patent: Apr. 16, 2024

(54) COMBINATION RETRACTABLE LEASH AND PET TOY

(71) Applicant: Charlie F. Pope, Colleyville, TX (US)

(72) Inventor: Charlie F. Pope, Colleyville, TX (US)

( * ) Notice: Subject to any disclaimer, the term of this patent is extended or adjusted under 35 U.S.C. 154(b) by 175 days.

(21) Appl. No.: 17/540,893

(22) Filed: Dec. 2, 2021

Related U.S. Application Data

(60) Provisional application No. 63/120,481, filed on Dec. 2, 2020.

(51) Int. Cl.
*A01K 27/00* (2006.01)
*A01K 15/02* (2006.01)

(52) U.S. Cl.
CPC .......... *A01K 27/004* (2013.01); *A01K 15/026* (2013.01)

(58) Field of Classification Search
CPC .............................. A01K 27/004; A01K 15/026
See application file for complete search history.

(56) References Cited

U.S. PATENT DOCUMENTS

| | | | |
|---|---|---|---|
| 4,796,566 A * | 1/1989 | Daniels ................. | A01K 27/004 119/789 |
| 6,845,737 B1 * | 1/2005 | Austin .................. | A01K 27/004 119/796 |
| 10,602,720 B1 | 3/2020 | Schwartz | |
| 2007/0056527 A1 * | 3/2007 | Sparks .................. | A01K 1/04 119/796 |
| 2010/0126430 A1 | 5/2010 | Munroe | |
| 2011/0180015 A1 | 7/2011 | Larson | |
| 2013/0000566 A1 * | 1/2013 | Berton ................. | A01K 27/008 119/796 |
| 2016/0219838 A1 * | 8/2016 | Flaig .................... | A01K 27/004 |
| 2018/0027774 A1 | 2/2018 | Arnold et al. | |
| 2018/0192617 A1 | 7/2018 | Jirsa et al. | |
| 2019/0289825 A1 | 9/2019 | Blubaugh | |

FOREIGN PATENT DOCUMENTS

WO    WO 2015030936    3/2015

\* cited by examiner

*Primary Examiner* — Jessica B Wong
(74) *Attorney, Agent, or Firm* — Kenneth L. Tolar

(57) ABSTRACT

A combination leash and pet toy includes a hollow casing having an exterior surface formed of an FDA-approved rubber similar to that of conventional chew toys. Extending from the casing interior is a spring-biased cord having a swiveling bolt-snap connector at a distal end for coupling with a pet collar. The connector can removably seat within a cavity that is enclosed with a locking lid when the device is being used as a toy. Accordingly, the device may be used as a conventional dog leash by coupling the snap connector to a pet leash. To convert the device to a toy, a user places the snap connector within the cavity and secures the lid to the casing. The casing can then be safely chewed or carried by a pet or tossed by the pet's owner as with a conventional pet toy.

11 Claims, 4 Drawing Sheets

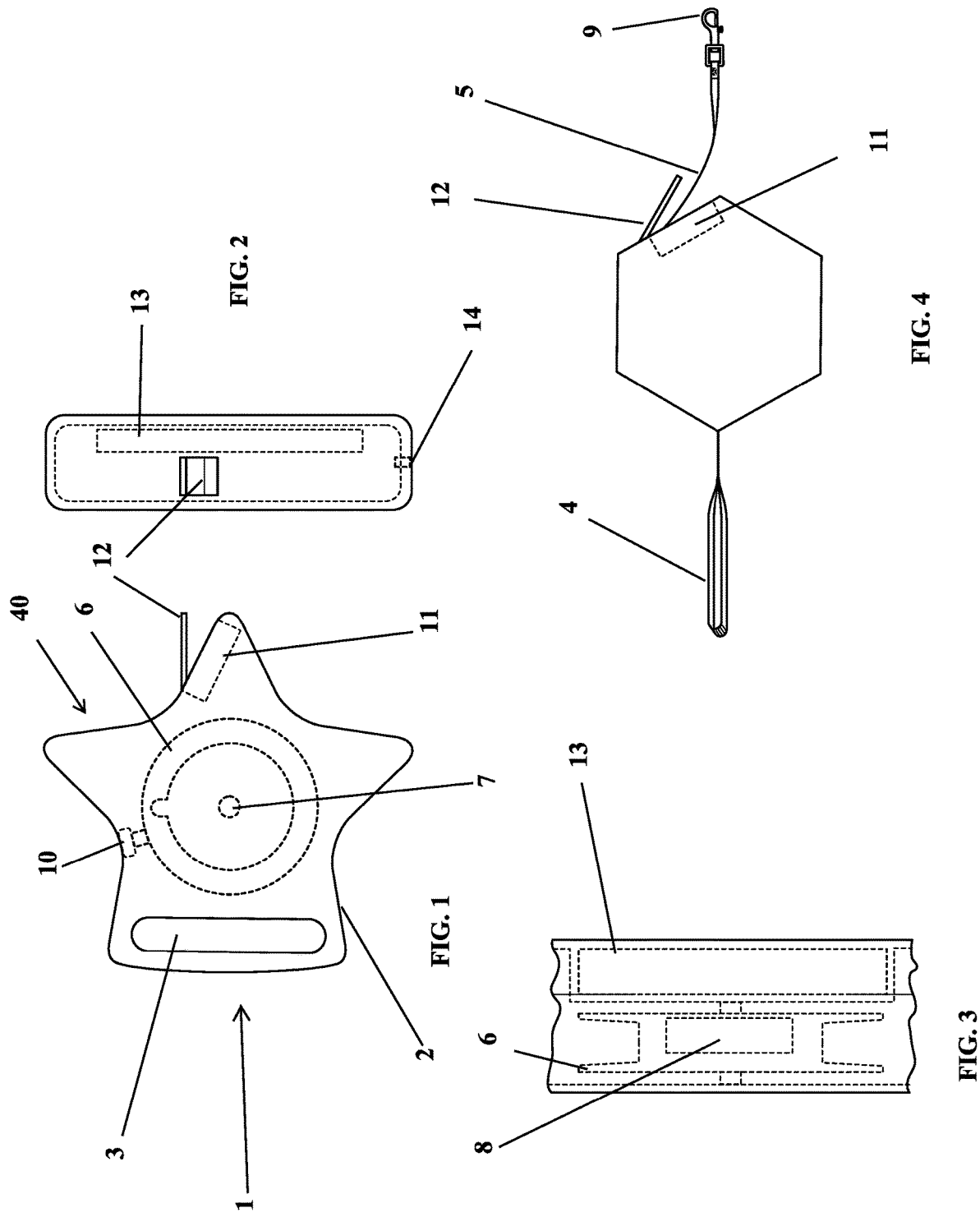

COMBINATION RETRACTABLE LEASH AND PET TOY

CROSS REFERENCE TO RELATED APPLICATIONS

This application claims priority of provisional application No. 63/120,481 filed on Dec. 2, 2020, the specification of which is incorporated herein by reference.

BACKGROUND OF THE INVENTION

The present invention relates to a combination retractable pet leash and pet toy.

DESCRIPTION OF THE PRIOR ART

When pet owners travel with their pets to a park or other location, they usually transport multiple devices, including a leash and toys. Since remembering to include a toy is often challenging, it is often left behind, depriving the pet of a favorite activity. If brought, the toy is easily lost, misplaced, or left at a remote location. Accordingly, there is currently a need for a device that minimizes the burdensome practice of separately transporting multiple pet accessories. A review of the prior art reveals a myriad of pet leashes that are adapted to attach various accessory items. For example, U.S. patent publication no. 2010/0126430 to Munroe discloses a protective sleeve that prevents a dog from chewing a woven leash.

U.S. patent publication no. 2010/0180015 to Larson discloses a chew-proof leash and collar.

U.S. patent publication no. 2018/0027774 to Arnold et al. discloses a leash having a first strap segment for attaching to a pet collar and a second strap segment attachable to a pet toy.

U.S. patent publication no. 2018/0192617 to Jirsa et al. discloses a leash having a magnet for mating attachment with a magnet on a pet toy.

U.S. patent publication no. 2019/0289825 to Blubaugh discloses a leash having a ball at a distal end that prevents the leash from sliding through a loop on a pet collar.

U.S. Pat. No. 10,602,720 to Schwartz discloses a chew toy slidably attached to a pet leash.

The international patent publication no. WO 2015/030936 to Reukema discloses a child's restraining strap constructed with an FDA-approved, semi-rigid elastomer for tethering a child's cup or bottle.

As indicated above, a few pet leashes that are adapted to attach various pet toys exist in the prior art. However, since the toy is not an integral component of the leash, the toy can easily be left behind or lost. None of the prior art devices disclose a leash that is easily convertible to a pet toy. The present invention overcomes the disadvantages of the prior art by providing a pet toy having an integrated retractable leash to conveniently combine both items into a single unit.

SUMMARY OF THE INVENTION

The present invention relates to a combination leash and pet toy comprising a hollow casing having an exterior surface formed of an FDA-approved rubber similar to that of conventional chew toys. Extending from the casing interior is a spring-biased cord having a swiveling bolt-snap connector at a distal end for coupling with a pet collar. The connector can removably seat within a cavity that is enclosed with a locking lid when the device is being used as a toy. Accordingly, the device may be used as a conventional dog leash by coupling the snap connector to a pet leash. To convert the device to a toy, a user places the snap connector within the cavity and secures the lid to the casing. The casing can then be safely chewed or carried by a pet or tossed by the pet's owner as with a conventional pet toy.

It is therefore an object of the present invention to provide a pet toy having an integral leash.

It is therefore another object of the present invention to provide a combination pet toy and retractable leash that minimizes the burden of transporting multiple accessory items with a pet.

It is yet another object of the present invention to provide a combination retractable leash and pet toy that is buoyant.

Other objects, features, and advantages of the present invention will become readily apparent from the following detailed description of the preferred embodiment when considered with the attached drawings and the appended claims.

BRIEF DESCRIPTION OF THE DRAWINGS

FIG. 1 is a front, plan view the combination leash and pet toy according to the present invention.

FIG. 2 is a top view of the combination leash and pet toy.

FIG. 3 is a side view of the combination leash and pet toy.

FIG. 4 is a front view of a different embodiment of the combination leash and pet toy.

DESCRIPTION OF THE PREFERRED EMBODIMENT

Figure 5:
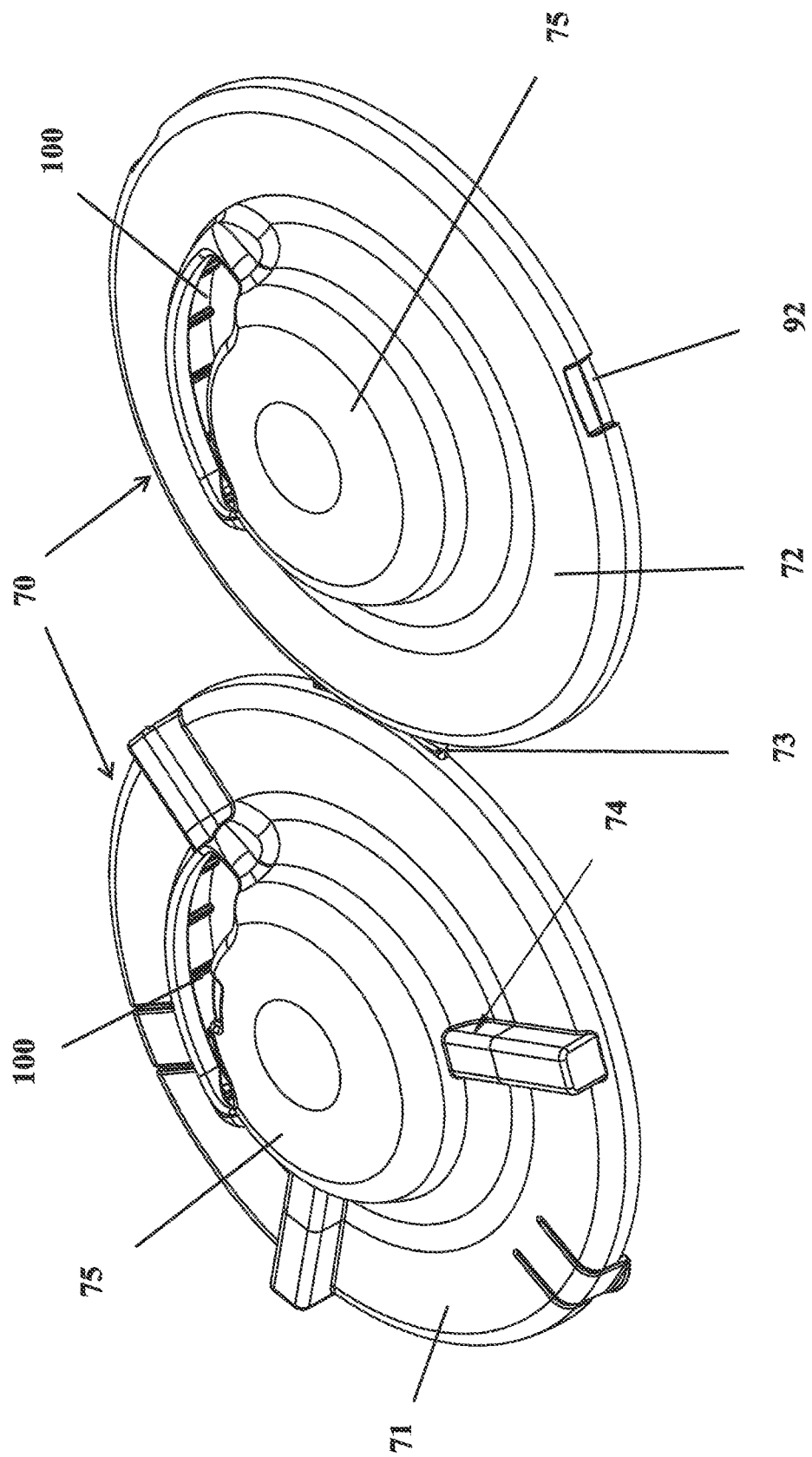
FIG. 5 depicts the disposable casing in an open position according to a second embodiment of the present invention.

The present invention relates to a pet toy having an integral, retractable leash comprising a hollow casing 1 having a front surface, a rear surface, an interior chamber, and at least one peripheral edge 2. The casing could be geometrically configured to resemble a bone, a star 40, or any other common pet toy feature, or could be circular, ovate, or hexagonal 50 to resemble a conventional retractable leash. The exterior surface of the casing is formed of an FDA-approved, BPA-free silicon rubber similar to that of conventional chew toys, that is either smooth or textured. The texture can be varied to include small, subtle undulations or taller, rounded cones depending upon the intended user. The casing could include an elongated slot 3 for receiving a user's hand or a wrist strap 4 integrally molded with the rubber exterior.

Received within the casing is a strap or cord 5 spirally wrapped around a spring-biased reel 6 that rotates about a central axle 7. The reel interior contains a coiled spring 8 that is connected to both the axle and the reel to bias the reel in a first rotational direction that retracts the cord in the absence of tension. A distal end of the cord extends through an opening on the casing peripheral edge and includes a swiveling bolt-snap connector 9 for coupling with a pet collar. A spring-biased release button 10 operates a pawl latch or compression spring 60 that removably seats within a receptacle on the reel. When the button 10 is depressed a first time, the pawl latch disengages the reel, allowing the cord to freely extend, while the coiled spring retracts any excess slack. When the button is depressed again, the pawl latch locks the reel, preventing the cord from extending.

The cord opening is positioned within a cavity 11 that is dimensioned to receive the bolt-snap connector. A lid 12 superimposed on the cavity releasably fastens to the casing to enclose the snap connector when the device is being used as a toy. The lid 12 forms a watertight seal that prevents water intrusion into the casing interior when the toy is used in water.

Received within the casing interior, adjacent the spool, is an inflatable bladder 13 having a volume that is sufficient to float the casing when fully inflated and immersed in water. A drain aperture 14 and associated check valve removes accumulated water without allowing further water intrusion. Accordingly, the leash can be freely tossed into a pond, river, pool, or lake for a pet to chase or retrieve with no risk of sinking.

Accordingly, the device may be used as a conventional dog leash by coupling the snap connector to a pet leash. To convert the device to a toy, a user places the snap connector within the cavity and secures the lid to the casing. The casing can then be safely chewed or carried by a pet or tossed by the pet's owner like a conventional pet toy.

Now referring specifically to FIGS. 5-8, a second embodiment includes a consumable or disposable casing 70 with a reusable insert 80 that allows the leash to be used when the casing has been chewed or otherwise irreparably damaged by a pet. The casing is formed of an upper section 71 and a lower section 72 that are pivotally connected with a living hinge 73 that allows the two sections to open and close in a clamshell type fashion. The upper section 71 includes a plurality of radially extending tunnels 74, at least one of which includes a passageway for the cord or strap 5 to exit the casing. Both sections include a centrally disposed pocket 75 that provide a space for removably receiving the reusable insert 80. The upper section 71 includes a rigid but pliable clamp member 90 that removably seats within a receptacle 92 on the lower section to secure the sections around the insert. Each section 71, 72 also includes an opening 100 near an outer periphery that aligns with the other opening when the two sections are closed to form a hand receptacle. As with the embodiment of FIGS. 1-4, the casing sections are preferably formed of an FDA-approved rubber similar to that of conventional chew toys, that is either smooth or textured. The texture can be varied to include small, subtle undulations or taller, rounded cones depending upon the intended user.

Figure 7:
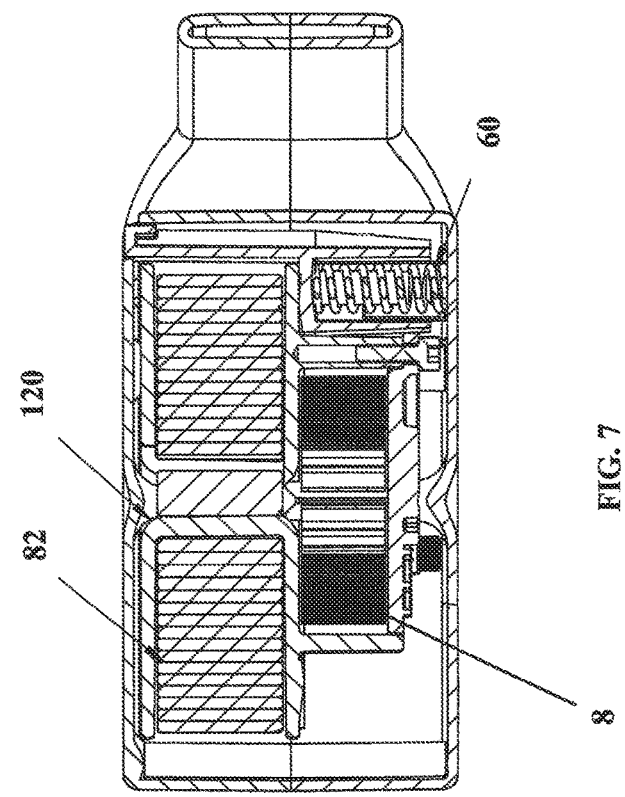
FIG. 7 is a sectional, detailed view of the internal spring-biasing and locking mechanism.
Figure 6:
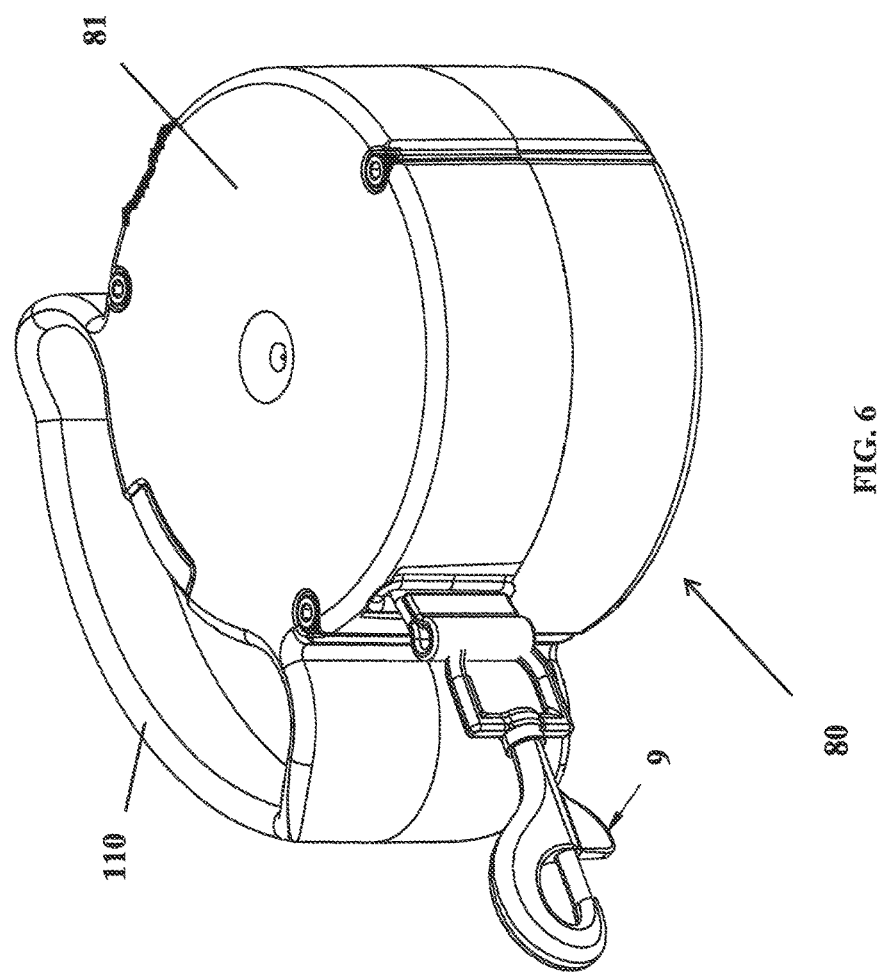
FIG. 6 depicts the reusable insert according to the embodiment of FIG. 5.
Figure 8:
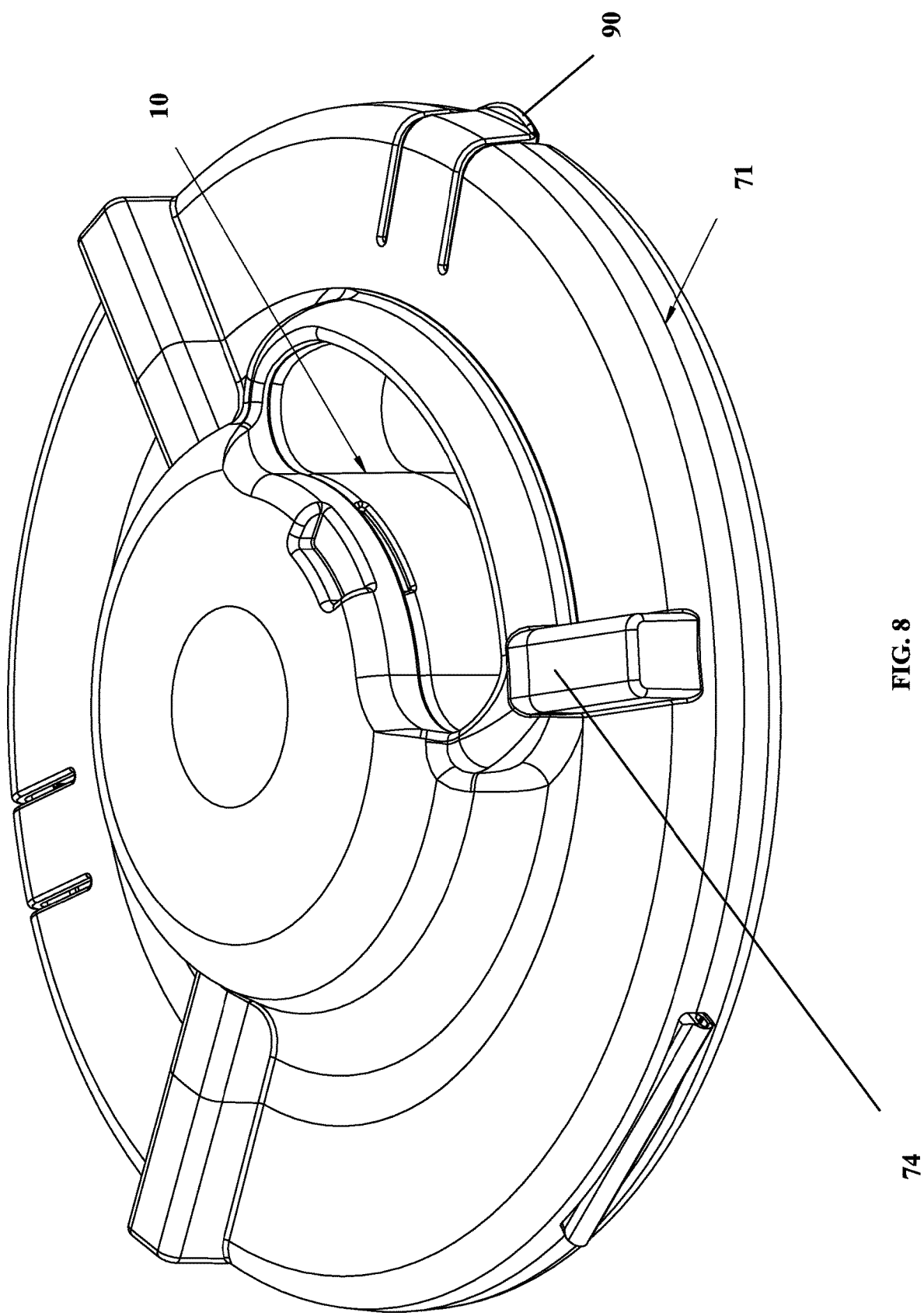
FIG. 8 is an isolated view of the upper casing section of the embodiment depicted in FIG. 5.

Now referring to FIGS. 6 and 7, the reusable insert 80 is a retractable leash including a housing 81 containing a spring-biased retractable locking leash 82 spirally wrapped around a reel 120. The housing is adapted to fit within the mating pockets 75 on the casing sections. A handle 110 on the housing periphery is dimensioned and configured to fit within the hand opening on the casing. A strap or cord with a rotating swiveling bolt-snap connector 9 exits an aperture on the housing periphery which is placed within the designated tunnel passageway. As with the embodiment of FIGS. 1-4, the casing could include a cavity and associated lid for receiving the swiveling bolt-snap connector when the device is being used a pet toy. Moreover, either the disposable casing or the removable insert may have an inflatable bladder that allows the leash to be tossed into a body of water with no risk of sinking.

Accordingly, when the casing has been irreparably damaged by a pet, the sections are opened, the insert is removed, the damaged casing is discarded, and the insert is placed within a new disposable casing. Therefore, the more costly retractable leash components need not be discarded along with the damaged casing.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A combination leash and pet toy comprising:
   a hollow casing having a front surface, a rear surface, at least one peripheral edge and an interior chamber, said casing having an exterior layer formed of an FDA-approved material that is safe for a pet to chew;
   a spring-biased retractable strap received within the interior chamber, said retractable strap having a distal end extending through an opening on said casing;
   a connector at the distal end of said strap for securing to a pet collar;
   an inflatable bladder received within said interior chamber for floating the casing when placed in water.

2. The combination according to claim 1 wherein said opening on said casing is positioned within a cavity that is dimensioned and configured to receive said connector.

3. The combination according to claim 2 further comprising a lid superimposed on said cavity that releasably fastens to the casing to enclose the snap connector when the device is being used as a toy.

4. The combination according to claim 3 wherein said lid forms a watertight seal with said casing that prevents water intrusion into the interior chamber when the casing is placed in water.

5. The combination according to claim 1 wherein said casing includes a drain aperture and a check valve for removing accumulated water without allowing further water intrusion so that said casing is usable in water with no risk of sinking.

6. The combination according to claim 1 wherein said casing is formed of a pair of sections that open and close in a clamshell-type fashion.

7. The combination according to claim 6 wherein said retractable leash is removably secured within said pair of sections.

8. The combination according to claim 7 wherein one of said pair of sections includes a clamp member that removably seats within a receptacle on another of said pair of sections.

9. The combination according to claim 1 wherein said casing is textured to resemble a chew toy.

10. The combination according to claim 1 wherein said casing is geometrically configured to resemble a pet toy.

11. The combination according to claim 1 further comprising a handle on said casing.

\* \* \* \* \*